United States Patent [19]

Louis et al.

[11] 4,426,240

[45] Jan. 17, 1984

[54] ADHESIVE COMPOSITIONS AND METHOD EMPLOYING SAME

[75] Inventors: Eckhart Louis, Burghausen; Ernst Aigner, Tyrlaching; Wolfgang Hechtl, Burghausen, all of Fed. Rep. of Germany

[73] Assignee: Wacker-Chemie GmbH, Munich, Fed. Rep. of Germany

[21] Appl. No.: 405,135

[22] Filed: Aug. 4, 1982

Related U.S. Application Data

[63] Continuation of Ser. No. 184,555, Sep. 5, 1980, abandoned.

[30] Foreign Application Priority Data

Oct. 9, 1979 [DE] Fed. Rep. of Germany ....... 2940917

[51] Int. Cl.$^3$ .............................................. B32B 17/00
[52] U.S. Cl. ........................................ 156/99; 29/572; 136/261; 156/307.3; 156/329; 428/429; 428/447; 528/15; 528/31; 528/32
[58] Field of Search ............... 156/99, 329, 307.3; 528/15, 32, 31; 29/572; 136/261; 428/429, 447

[56] References Cited

U.S. PATENT DOCUMENTS

| | | | |
|---|---|---|---|
| 3,020,260 | 2/1962 | Nelson | 528/15 |
| 3,284,406 | 11/1966 | Nelson | 528/15 |
| 3,436,366 | 4/1969 | Mosic | 528/15 |
| 3,616,839 | 11/1971 | Burrin et al. | 156/99 |
| 3,697,473 | 10/1972 | Polmonteer et al. | 528/15 |
| 3,814,731 | 6/1974 | Nitzsche et al. | 528/31 |
| 4,043,977 | 8/1977 | de Montiguy et al. | 528/32 |
| 4,061,609 | 12/1977 | Bobear | 528/15 |
| 4,239,867 | 12/1980 | Legrow et al. | 528/32 |

*Primary Examiner*—John J. Gallagher

[57] ABSTRACT

This invention relates to adhesive compositions which may be used for bonding laminated glass and for glueing silicon semiconductor elements onto substrates in manufacturing solar cells. These adhesive compositions contain organopolysiloxanes having SiC-bonded vinyl groups and Si-bonded hydrogen as well as catalysts which promote the addition of Si-bonded hydrogen to vinyl groups. All of the organopolysiloxanes in these compositions are free of Si-bonded hydroxylk or alkoxy groups and contain on the average 2 to 1,000 silicon atoms per molecule in which at least 99.5 percent and preferably 99.9 percent of the number of Si-bonded hydrogen atoms are present in organopolysiloxanes containing one Si-bonded hydrogen atom per molecule and one SiC-bonded vinyl group per molecule or containing 2 Si-bonded hydrogen atoms per molecule and at least 99.5 percent and preferably 99.9 percent of the number of SiC-bonded vinyl groups are present in organopolysiloxanes containing one Si-bonded hydrogen atom per molecule and one SiC-bonded vinyl group per molecule or containing 2 SiC-bonded vinyl groups per molecule.

8 Claims, No Drawings

ADHESIVE COMPOSITIONS AND METHOD EMPLOYING SAME

This is a continuation of application Ser. No. 184,555, filed Sept. 5, 1980, now abandoned.

The present invention relates to organopolysiloxane compositions and more particularly to organopolysiloxane compositions which may be used for bonding unprimed substrates.

BACKGROUND OF INVENTION

Adhesive compositions containing organopolysiloxanes having vinyl groups, organopolysiloxanes having Si-bonded hydrogen atoms and catalysts which promote the addition of Si-bonded hydrogen atoms to the vinyl groups are described in U.S. Pat. No. 4,051,454 to Leiser et al. The vinyl containing organopolysiloxanes have a viscosity of at least 100,000 cp at 25° C. and consist of diorganopolysiloxanes having from 0.1 to 1.0 mol percent of vinylmethylsiloxane units. These vinyl containing organopolysiloxanes contain no other vinyl groups other than the vinylmethylsiloxane units and triorganosiloxy groups and the remaining organic radicals are methyl and phenyl groups. The organopolysiloxanes having Si-bonded hydrogen atoms contain at least three Si-bonded hydrogen atoms and have from 0.01 to 1.7 percent by weight of Si-bonded hydrogen atoms. The silicon atoms which are not saturated with hydrogen atoms or siloxane oxygen atoms, are saturated with monovalent hydrocarbon radicals which are free of aliphatic unsaturation.

Adhesive compositions which form elastomeric or resinous compounds are also described in U.S. Pat. No. 3,527,655 to Ballard. These adhesive compositions are prepared from vinyl end-blocked organopolysiloxanes, organopolysiloxanes having Si-bonded hydrogen atoms, vinyl siloxane fluids having Si-bonded hydroxyl and alkoxy groups and catalysts which promote the addition of Si-bonded hydrogen atoms to vinyl groups.

When compared with the known adhesives, the compositions of this invention have several advantages over the adhesive compositions described in the above patents. For example, the organopolysiloxanes employed in the adhesive compositions of this invention are free of Si-bonded hydroxyl or alkoxy groups. The adhesives of this invention differ from and are superior to the adhesives described in U.S. Pat. No. 4,051,454 in that they contain organopolysiloxanes having a substantially lower viscosity. Thus, they need not be diluted with a solvent before they can be applied to substrates which are to be bonded together. This in turn substantially reduces the environmental problems generally associated with the presence of a solvent and also enhances their potential areas of application. Moreover, it is now possible to manufacture adhesives which are transparent and provide a means for glueing or coating solar cells. Surprisingly, substrates which are bonded together using the compositions of this invention adhere well even when the adhesive coatings do not contain any or contain fewer cross-linking sites than adhesive coatings prepared heretofore from the known adhesive compositions. Furthermore, the high degree of strength of the adhesive bond obtained from the compositions of this invention is indeed surprising since they do not contain the adhesion promoting organopolysiloxanes which are essential components in the compositions of U.S. Pat. No. 3,527,655.

It is therefore an object of this invention to provide adhesive compositions. Another object of this invention is to provide adhesive compositions which are transparent. Still another object of this invention is to provide adhesive compositions which may be used to prepare highly transparent laminated glasses. Still another object of this invention is to provide adhesive compositions having improved bond strength. A further object of this invention is to provide adhesive compositions which may be used for bonding unprimed substrates. A still further object of this invention is to provide adhesive compositions which may be used in the absence of a solvent.

SUMMARY OF INVENTION

The foregoing objects and others which will become apparent from the following description are accomplished in accordance with this invention, generally speaking, by providing adhesive compositions for bonding unprimed substrates comprising organopolysiloxanes having SiC-bonded vinyl groups and Si-bonded hydrogen atoms as well as a catalyst which promotes the addition of Si-bonded hydrogen atoms to vinyl groups in which all of the organopolysiloxanes are free of Si-bonded hydroxyl or alkoxy groups, and have on the average from 2 to 1,000 silicon atoms per molecule in which at least 99.5 percent of the number of Si-bonded hydrogen atoms are present in organopolysiloxanes containing one Si-bonded hydrogen atom per molecule and one SiC-bonded vinyl group per molecule or containing 2 Si-bonded hydrogen atoms per molecule, and at least 99.5 percent of the number of SiC-bonded vinyl groups are present in organopolysiloxanes containing one Si-bonded hydrogen atom per molecule and one SiC-bonded vinyl group per molecule or containing 2 SiC-bonded vinyl groups per molecule.

DETAILED DESCRIPTION OF INVENTION

The organopolysiloxanes containing Si-bonded hydrogen atoms and Si-bonded vinyl groups which are used in the adhesive compositions are preferably linear organopolysiloxanes. The organopolysiloxanes present in the compositions of this invention contain Si-bonded hydrogen atoms and SiC-bonded vinyl groups, in which at least 99.5 percent and preferably at least 99.9 percent of the number of the Si-bonded hydrogen atoms and at least 99.5 percent and preferably 99.9 percent of the number of the Si-bonded vinyl groups both may be present in the same molecule having organosiloxane units. An example thereof are organopolysiloxanes of the formula

$$CH_2=CH(CH_3)_2SiO[Si(CH_3)_2O]_nSi(CH_3)_2H,$$

wherein n represents 0 or an integer having a value of from 1 to 998. The substantially linear organopolysiloxanes having SiC-bonded vinyl groups and the substantially linear organopolysiloxanes having Si-bonded hydrogen atoms may however also consist of a mixture of at least two different kinds of molecules in which the organopolysiloxane units present therein are different. An example of such a mixture is a mixture of compounds of the formula

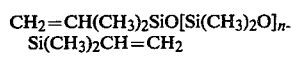

$$CH_2=CH(CH_3)_2SiO[Si(CH_3)_2O]_n\text{-}Si(CH_3)_2CH=CH_2$$

and compounds of the formula $H(CH_3)_2SiO[Si(CH_3)_2O]_nSi(CH_3)_2H$, where n is the same as above.

The compositions of this invention may contain substantial linear organopolysiloxanes having the general formulas:

| | |
|---|---|
| $CH_2=CHR_2Si(OSiR_2)_nOSiR_2CH=CH_2$, | (1) |
| $(CH_2=CH)_2RSi(OSiR_2)_nOSiR_3$, | (2) |
| $CH_2=CHR_2Si(OSiR_2)_nOSiR_2H$, | (3) |
| $HR_2Si(OSiR_2)_nOSiR_2H$, | (4) |
| $R_3Si(OSiR_2)_{n'}[OSi(CH_3)H]_2OSiR_3$ | (5) |
| $R_3Si(OSiR_2)_{n'}[OSi\ CH=CH_2(CH_3)]_2OSiR_3$ | (6) |

In these formulas R represents the same or different, monovalent hydrocarbon radicals which are free of aliphatic multiple bonds, while n is the same as above and n' represents 0 or an integer having a value of from 1 to 996.

It is preferred that on the average from 0.5 to 2 Si-bonded hydrogen atoms be present for each SiC-bonded vinyl group.

The hydrocarbon radicals represented by R preferably have from 1 to 8 carbon atoms per radical. Examples of hydrocarbon radicals represented by R are alkyl radicals, such as the methyl, ethyl, n-propyl and the isopropyl radical, as well as the octyl radicals, aryl radicals such as the phenyl radical, aralkyl radicals such as the benzyl radical, and alkaryl radicals such as the tolyl radical. Because of their availability, it is preferred that at least 80 percent of the number of organic radicals other than vinyl radicals in the organopolysiloxanes be methyl radicals.

Any catalyst which has been used or could have been used to promote the addition of Si-bonded hydrogen to vinyl groups may be used in this invention. Examples of suitable catalysts are metallic and finely dispersed platinum, ruthenium, rhodium, palladium, and iridium. These metals may be present on solid supports such as silicon dioxide, aluminum oxide or activated carbon. Compounds or complexes of these elements may also be used. Examples of suitable compounds are $PtCl_4$, $H_2PtCl_6.6H_2O$, $Na_2PtCl_4.4H_2O$, platinum-olefin complexes, platinum-alcohol or platinum-alcoholate complexes, platinum-ether complexes, platinum-aldehyde complexes, platinum-ketone complexes, platinum-vinylsiloxane complexes, especially platinum-divinyltetramethyldisiloxane complexes with or without a detectable amount of inorganic bonded halogen, bis-(gamma-picoline)-platinum-dichloride, trimethylenepyridine-platinum dichloride, as well as iron, nickel and cobalt carbonyls.

When platinum, ruthenium, rhodium, iridium or a mixture containing at least two of these elements or at least one compound of these elements and/or at least one complex of these elements is used as a catalyst to promote the addition of Si-bonded hydrogen to vinyl groups, then these catalysts are preferably used in an amount of from 5 to 500 ppm (parts by weight per million), calculated as the precious metal and based on the total weight of the composition.

In order to ensure high strength bonding, the adhesive compositions of this invention may contain not only the organosiloxanes described above, i.e., the substantially linear organopolysiloxanes having the above formulas, but may also include other organosiloxanes or linear or branched organopolysiloxanes having a total of at least 3 Si-bonded hydrogen atoms and/or SiC-bonded vinyl groups per molecule, with the proviso that at least 99.5 percent and preferably at least 99.9 percent of the number of all Si-bonded hydrogen atoms in the linear organopolysiloxanes have an Si-bonded hydrogen atom and an Si-bonded vinyl group per molecule or have two Si-bonded hydrogen atoms per molecule, and that at least 99.5 percent and preferably at least 99.9 percent of the number of SiC-bonded vinyl groups in the organopolysiloxanes have an Si-bonded hydrogen atom and an SiC-bonded vinyl group per molecule or have two SiC-bonded vinyl groups per molecule and that these organopolysiloxanes be free of Si-bonded hydroxyl or alkoxy groups.

Consequently, in some of the organopolysiloxanes described in formulas (1) through (6) above, at least one $R_2SiO$ unit can be substituted with a $CH_2=CHRSiO$ unit and/or an $Si(CH_3)(H)O$ unit.

In addition to the organopolysiloxanes having SiC-bonded vinyl groups and Si-bonded hydrogen and a catalyst which promotes the addition of Si-bonded hydrogen to vinyl groups, the compositions of this invention may also contain other materials which may be present in compositions containing organopolysiloxanes having SiC-bonded vinyl groups and organopolysiloxanes having Si-bonded hydrogen and a catalyst which promotes the addition of Si-bonded hydrogen to vinyl groups. Examples of such other materials are reinforcing fillers, agents which retard or delay the addition of Si-bonded hydrogen to vinyl groups at room temperature, non-reinforcing fillers, flame-retardants, pigments, soluble dyes and emollients, such as liquid dimethylpolysiloxanes which are end-blocked by trimethylsiloxy groups, as well as photosensitizers, such as benzophenone, which accelerate the addition of Si-bonded hydrogen to the vinyl groups.

When the compositions of this invention contain fillers, especially reinforcing fillers, such as pyrogenically produced silicon dioxide, then such fillers may contain organosilyl groups on their surface.

The coatings obtained from the compositions of this invention, which are based on the addition of Si-bonded hydrogen to SiC-bonded vinyl groups, adhere extremely well to unprimed substrates consisting of inorganic solid materials such as glass and semiconductor-silicon as well as metals, organopolysiloxane elastomers and pure synthetic organic materials such as polycarbonates and even polyethylene and polytetrafluoroethylene.

The compositions obtained from the addition of Si-bonded hydrogen to SiC-bonded vinyl groups, in accordance with this invention, form highly transparent, heat and light resistant coatings between the substrates which are to be bonded. The formation of these coatings can be accelerated by heating and/or by ultraviolet radiation and takes place without any shrinkage. The coatings thus formed remain plastically or elastically deformable within a temperature range of from $-50°$ to $+200°$ C. and they will not attack metals or plastics to cause corrosion or crazing.

When the components are properly selected, compositions prepared in accordance with this invention are not objectionable physiologically with respect to their processing as well as their utilization.

The compositions of this invention may be used for bonding substrates together by applying the compositions to one or both surfaces of the substrates and thereafter contacting the coated surfaces. These compositions may be applied to the substrates by various techniques, such as for example, coating, casting or dipping.

The compositions used as adhesives in accordance with this invention may for example be used in manufacturing laminated glass such as bullet-proof glass and other types of laminated glass, for example glass used for soundproofing, by bonding together various substrates, for example glass, or synthetic films such as polycarbonate film. Also these compositions may be used for bonding semiconductor elements, especially silicon semiconductor elements, to glass or plastic substrates in manufacturing solar cells, as well as for bonding medical or cosmetic devices or other objects to substrates (or supports). The compositions of this invention may also be used for manufacturing optical or photoelectric instruments.

In the following examples all parts and percentages are by weight unless otherwise specified. The viscosities were determined at 25° C.

The platinum-divinyltetramethyldisiloxane complex and diluent used in Example 1 was prepared in the following manner:

About 20 parts of sodium bicarbonate were added to a mixture containing 10 parts of $H_2PtCl_6.6H_2O$, 20 parts of 1,3-divinyl-1,1,3,3-tetramethyldisiloxane and 50 parts of ethanol. The mixture was boiled for 60 minutes under reflux, allowed to stand for 15 hours and then filtered. The volatile components were removed from the filtrate by distillation at 1596 Pa (abs.). The residue was then dissolved in benzene, filtered and the benzene removed from the filtrate by distillation. The residue was then mixed with a methylvinyl terminated dimethylpolysiloxane having a viscosity of 1,400 mPa.s as a diluent in such an amount that the mixture contains 1 percent platinum, calculated as the element.

EXAMPLE 1

(a) In a Double-Z-Kneader 1,000 parts of a hydroxyl terminated dimethylpolysiloxane having a viscosity of 1,000 mPa.s is kneaded at 260 Pa (abs.) and at a temperature of from 90° to 100° C. with 0.11 parts of a 25 percent solution of phosphoronitrile chlorides in methylene chloride which was obtained from the reaction 2 mols of phosphoropentachloride with 1 mol ammonium chloride. After kneading for 5 hours at a temperature of from 90° to 100° C., a composition is obtained which is solid at room temperature. This composition is then heated for 3 hours to 150° C. at 260 Pa.

(b) The highly viscous organopolysiloxane prepared in accordance with the procedure described in (a) above was cooled to 40° C., and mixed in the kneader with a total of 440 parts of a mixture consisting of equal parts of a dimethylhydrogensiloxy terminated dimethylpolysiloxane having an average of 100 dimethylsiloxane units per molecule, and a dimethylvinylsiloxy terminated dimethylpolysiloxane having an average of 100 dimethylsiloxane units per molecule, and a total of 0.35 parts of the phosphoronitrile chloride solution described in (a) above. The dimethylpolysiloxane and phosphoronitrile chloride solution is added to the kneader in four increments. After kneading at 40° C. for 20 hours, the viscosity of the kneaded liquid remains unaltered. The product is a dimethylpolysiloxane having on an average an equal number of terminal dimethylhydrogensiloxy groups as dimethylvinylsiloxy groups and following the removal of the volatile components in a thin-film evaporator, the product has a viscosity of about 2000 mPa.s.

(c) The organopolysiloxane prepared in accordance with the procedure described in (b) above is mixed with 0.05 percent of a mixture consisting of a platinum-divinyltetramethyldisiloxane complex and diluent and added to polypropylene dishes. Immediately thereafter, glass, semi-conductor silicon, polycarbonate, polytetrafluoroethylene, polyethylene and stainless steel strips are placed in the dishes. After standing at room temperature for 24 hours and after standing for 2 hours at 60° C., a tough, plastic, strongly adhesive composition is obtained. When an attempt is made to pull the various strips from the composition, cohesive failure is observed in all cases. In no case was adhesive failure observed; i.e., a break in the adhesion between the composition and the embeded strips.

EXAMPLE 2

(a) About 400 g of the highly viscous organopolysiloxane prepared in accordance with the procedure described in Example 1, (a) above are mixed in the kneader with a total of 7.4 g of 1,3-dihydrogen-1,1,3,3-tetramethyldisiloxane which is added in 4 increments and a total of 0.02 ml of the phosphoronitrile chloride solution which, likewise is added in 4 increments. The phosphoronitrile chloride solution is prepared in accordance with the procedure described in Example 1(a). After kneading for 24 hours at room temperature, no further change in the viscosity of the kneader liquid is observed. After the volatile components have been removed with the aid of a thin-film evaporator, a dimethylhydrogensiloxy terminated dimethylpolysiloxane is obtained. The dimethylpolysiloxane contains on the average about 100 dimethylsiloxane units per molecule and about 0.027 percent Si-bonded hydrogen atoms.

(b) The process described in Example 2 (a) above is repeated, except that 10.3 g of 1,3-divinyl-1,1,3,3-tetramethyldisiloxane is substituted for the 7.4 g of 1,3-dihydrogen-1,1,3,3-tetramethyldisiloxane. After removing the volatile components with the aid of a thin-film evaporator, the product consists of a dimethylvinylsiloxy terminated dimethylpolysiloxane. The dimethylpolysiloxane has an average of about 100 dimethylsiloxane units per molecule and an iodine number of 6.8.

(c) Into a mixture consisting of 1,500 g of a dimethylhydrogen siloxy terminated dimethylpolysiloxane, prepared in accordance with the procedure described in Example 2(a) above and 1,700 g of a dimethylvinylsiloxy terminated dimethylpolysiloxane, prepared in accordance with the procedure described in Example 2(b) above, are added 12.3 g of a trimethylsiloxy endblocked organopolysiloxane having a viscosity of 7000 mPa.s which consists of 12.5 percent methylhydrogen siloxane units and 87.5 percent of dimethylsiloxane units, plus 50 ppm of platinum in the form of a mixture consisting of a platinum-divinyltetramethyldisiloxane complex and a diluent. The resultant mixture is poured into polypropylene dishes. Immediately thereafter strips of the materials listed in Example 1(c) above are placed in dishes. After the product stood at room temperature for 3 hours, a substantial increase in viscosity was observed and then it was allowed to stand overnight. A tough composition was obtained. When an attempt was made to pull the previously inserted strips from this composition, cohesive failure was observed, i.e., the composition separated, but no adhesion failure, i.e., no separation was observed between the embedded strips and the composition.

What is claimed is:

1. An adhesive composition for bonding unprimed substrates together which comprises substantially linear organopolysiloxanes having SiC-bonded vinyl groups and Si-bonded hydrogen atoms, and a catalyst which promotes the addition of Si-bonded hydrogen to vinyl groups, in which all the organopolysiloxanes are free of Si-bonded hydroxyl and alkoxy groups and contain an average of from 2 to 1,000 silicon atoms per molecule in which at least 99.5 percent of the number of Si-bonded hydrogen atoms are bonded to organopolysiloxanes having one Si-bonded hydrogen atom and one SiC-bonded vinyl group per molecule and at least 99.5 percent of the number of SiC-bonded vinyl groups are bonded to organopolysiloxanes having one Si-bonded hydrogen atom and one SiC-bonded vinyl group per molecule.

2. The composition of claim 1, wherein at least 99.9 percent of the number of Si-bonded hydrogen atoms are bonded to organopolysiloxanes having one Si-bonded hydrogen atom and one SiC-bonded vinyl group per molecule.

3. The composition of claim 1, wherein at least 99.9 percent of the number of SiC-bonded vinyl groups are bonded to organopolysiloxanes having one Si-bonded hydrogen atom and one SiC-bonded vinyl group per molecule.

4. The composition of claim 1, wherein the organopolysiloxanes are represented by the formula $$CH_2=CH(CH_3)_2SiO[Si(CH_3)_2O]_nSi(CH_3)_2H$$

where n is 0 or an integer of from 1 to 998.

5. The composition of claim 1, wherein the catalyst is selected from the group consisting of platinum, ruthenium, rhodium, palladium, irridium and compounds and complexes thereof.

6. The process for bonding two substrates together which comprises coating one surface of a substrate with the composition of claim 1 and then contacting the coated surface of one substrate with the other substrate.

7. The process of claim 6, wherein the two substrates are glass.

8. The process of claim 6, wherein the two substrates are transparent plastic materials.

* * * * *